United States Patent [19]
Eidinger

[11] 3,795,820
[45] Mar. 5, 1974

[54] CROSS-CONNECTION ARRANGEMENT BETWEEN PHASE-ISOLATED METAL ENCLOSURES OF INSULATING-GAS-FILLED HIGH-VOLTAGE CONDUCTORS

[75] Inventor: Adolf Eidinger, Nussbaumen, Switzerland

[73] Assignee: Brown Boveri & Company Limited, Baden, Switzerland

[22] Filed: Jan. 10, 1973

[21] Appl. No.: 322,388

[30] Foreign Application Priority Data
Jan. 18, 1972  Switzerland............................ 697/72

[52] U.S. Cl. ................................. 307/147, 317/44
[51] Int. Cl. .............................................. H02j 3/00
[58] Field of Search ............... 307/147, 148; 317/44

[56] References Cited
UNITED STATES PATENTS
514,167   2/1894   Tesla.................................. 307/148
2,148,136  2/1939   Samer................................. 317/44 X
3,292,016  12/1966  Kafka................................. 307/147 X Primary Examiner—William M. Shoop, Jr.
Attorney, Agent, or Firm—Pierce, Scheffler & Parker

[57] ABSTRACT

A polyphase high-voltage conductor system in which each phase conductor is enclosed within a metallic sheath filled with insulating gas. The sheaths are sectionalized into lengths which are directly and permanently cross-connected to each other at one end but at the opposite end are cross-connected through variable impedances which enable the currents flowing in the metallic sheaths to be varied between minimum and maximum values in relation to the service current to be transmitted by the conductors such that the conductors operate in a condition approximating the natural tie-line power.

6 Claims, 2 Drawing Figures

CROSS-CONNECTION ARRANGEMENT BETWEEN PHASE-ISOLATED METAL ENCLOSURES OF INSULATING-GAS-FILLED HIGH-VOLTAGE CONDUCTORS

The present invention relates to an improved cross-connection arrangement between phase-isolated metallic enclosures of insulating-gas-filled high-voltage conductors wherein the enclosure is divided lengthwise into sections, the sections being directly and permanently cross-connected to each other at one end while at the other end a circuit arrangement comprising various impedances is used to interconnect the sections.

Known methods of conveying very heavy currents, e.g., in power stations between the generator and the associated transformer, over distances up to some tens of metres include using conductor bars such that each phase is contained in a sheet-metal enclosure. In order to avoid losses due to secondary currents in the sheet-metal enclosures under normal operating conditions, but also to compensate dynamic forces due to currents in the event of a short circuit, a method is known and described in German Patent Application DT-AS 1,207,986 whereby the cross-connections between the phase-isolated enclosures incorporate arrangements, e.g., spark gaps, which in normal opearation form a discontinuity in the cross-connections between the enclosures, but in the event of a short circuit in the bus-bar system connect the sheet-metal enclosures laterally with each other. In such cases, the enclosures can be divided into sections, the enclosures being directly connected to each other at one end of each section and the spark gaps being located at the other end. With long high-voltage conductors, however, these known arrangements do not allow the most efficient form of operation because they take no account of the reactive losses which vary considerably with the magnitude of the instantaneous service current.

The objective of the present invention is to keep the reactive losses of long high-voltage conductors of the kind described as low as possible over the largest possible range of transmitted currents by influencing the currents in the walls of the enclosures. It is accordingly proposed that the cross-connections at one end incorporate variable impedances allowing the currents in the enclosure to be varied between a minimum and a maximum value in relation to the service current to be transmitted by the high-voltage conductor and in such a way that the high-voltage conductor operates in a condition approximating the natural tie-line power.

The invention will now be explained in more detail with reference to the accompanying drawings, in which.

Figure 1:
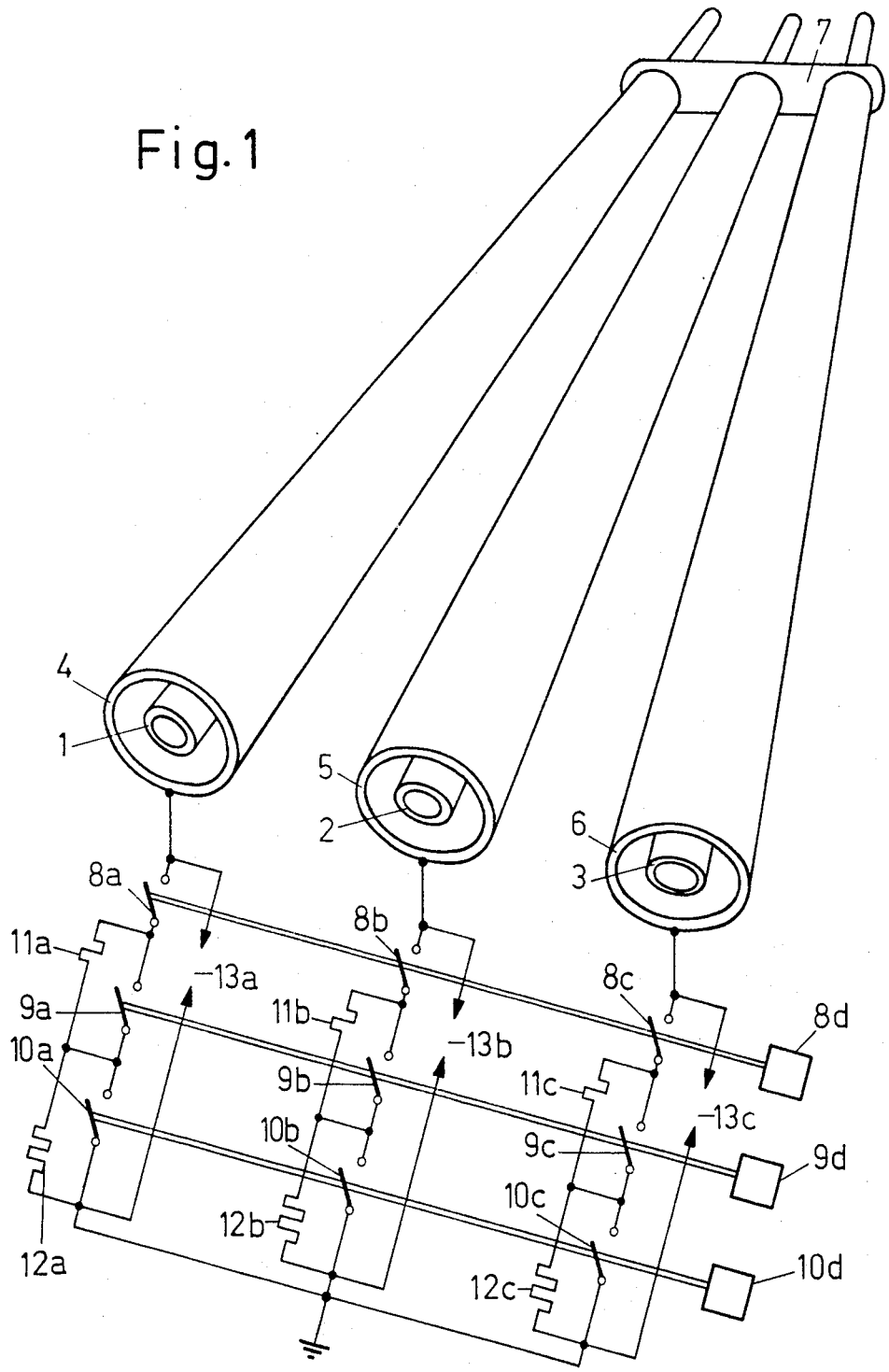
FIG. 1 is a three-phase portion of the high-voltage connection showing the apparatus of the invention for one section of the enclosure.

In FIG. 1 the three conductors 1, 2, 3 of the isolated phases are contained in sections of tubular metal enclosures or sheaths 4, 5, 6. At one end the enclosure sections 4, 5, 6 are connected to each other directly and permanently by means of cross-connection 7. At the other end the enclosure sections are connected to each other by way of identical circuit arrangements 8 to 13, the neutral point of the three arrangements being earthed. The circuit components for each individual phase comprise three series-connected switching elements 8a, 9a, 10a; 8b, 9b, 10b and 8c, 9c, 10c, respectively. The switching elements 9 and 10 each have parallel-connected resistances 11 and 12, respectively. The switching elements 8a, 8b, 8c are actuated jointly by a drive 8d, which can be remotely controlled. In the same way, switching elements 9a, 9b, 9c are provided with drive 9d, and switching elements 10a, 10b, 10c with drive 10d. Finally, each circuit arrangement has connected in parallel to its three series-connected switches a device 13a, 13b and 13c, respectively, which in the simplest case can be in the form of a spark gap which bridges the three switches when a preselectable value of the conductor current is reached, e.g., in the event of a short circuit. When switching elements 8, 9, 10 are closed, the full current (100 percent) flows in each section of enclosures 4, 5, 6. Depending on whether one or both switching elements 9, 10 are open, resistances 11 or 12 or both come into effect in stages, with the result that corresponding partial currents flow in enclosure sections 4, 5, 6. By suitably sizing i.e., by use of stepped resistances 11, 12 it is possible to arrange that a partial enclosure current of 40 percent, for example, occurs when both switching elements 9, 10 are open, but that a partial enclosure current of 50 percent flows when switching elements 10 only are open, or alternatively that a partial enclosure current of 70 percent occurs when only switching elements 9 are open. However, if switching elements 8 are opened, there is no flow of enclosure current (0 percent). In this manner the enclosure current can be adjusted to various values between 0 and 100 percent of the current flowing in conductors 1, 2, 3, the size of the steps being variable according to the stepping resistance used. The stepping resistance can also consist of non-linear impedances.

Figure 2:
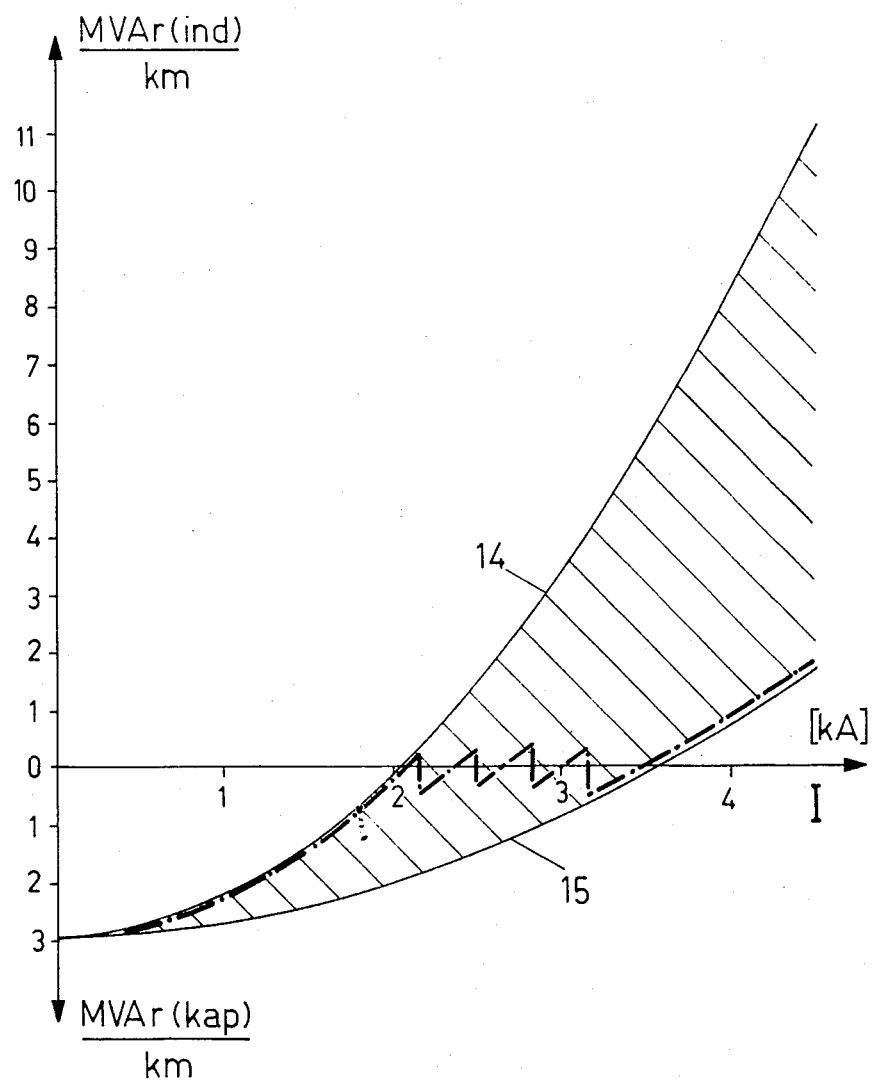
FIG. 2 is a diagram in which reactive losses per km are plotted against service current I, taking a high-voltage connection designated for 400 kV as an example.

FIG. 2 illustrates the operation of the apparatus shown in FIG. 1. Curve 14 represents the reactive power requirement of a 400 kV high-voltage line as a function of current I when no current flows in the enclosure (0 percent). Curve 15 shows the reactive power requirement in the case of the full enclosure current (100 percent). The chain-dotted curve indicates the operating condition obtainable with the apparatus of the invention for different transmission currents. It can be seen that it is possible to operate with a small reactive power requirement over a comparatively wide range of service currents. In the example shown, the reactive power requirement of the transmission line is less than 0.5 Mvar/km within a service current range from 1.9 to 3.8 kA.

The advantage of the new arrangement is that it allows operation with approximately natural power over a comparatively wide range of currents.

I claim:

1. In a polyphase high-voltage conductor system wherein rigid rectilinear conductors extend in parallel spaced relation and wherein said conductors are located within individual tubular metallic sheaths filled with an insulating gas, the sheaths being sectionalized into lengths, the improvement wherein the said sheath sections are directly and permanently cross-connected to each other at the end and at the opposite end are cross-connected by means including variable impedances thus enabling currents in the metallic sheaths to be varied between a minimum and maximum value in relation to the service current to be transmitted by the high-voltage conductors such that the conductors operate in a condition approximating the natural tie-line power.

2. The invention as defined in claim 1 wherein said variable impedance for each phase is constituted by series-connected stepped resistances, each said resistance being connected in parallel with a switching device which functions to provide a shut for the appertaining resistance.

3. The invention as defined in claim 1 wherein said variable impedance for each phase is paralleled by a device which serves to bridge the impedance when a preselectable value of the phase conductor current is reached.

4. The invention as defined in claim 1 wherein said variable impedance for each phase is constituted by series-connected stepped resistances, each said resistance being connected in parallel with a switching device which functions to provide a shunt for the appertaining resistance and wherein the stepped resistances for each phase are paralleled by a spark gap which functions to bridge the stepped resistances when a preselectable value of the phase conductor current is reached.

5. The invention as defined in claim 1 wherein said variable impedance for each phase is constituted by series-connected resistances, each said resistance being connected in parallel with a switching device which functions to provide a shunt for the appertaining resistance, and switch actuating means common to the switching devices which control corresponding valued resistances for each phase.

6. The invention as defined in claim 5 and which further includes a device connected in parallel with the series-connected resistances for each phase and which serves to bridge said resistances when a preselectable value of the phase conductor current is reached.

* * * * *